United States Patent [19]

Sanford et al.

[11] Patent Number: 5,032,164

[45] Date of Patent: Jul. 16, 1991

[54] MODIFIED LIGNOSULFONATE CONDITIONING AGENT FOR UREA PARTICLES

[75] Inventors: Michael E. Sanford, Wausau; Scott E. Davis, Schofield, both of Wis.

[73] Assignee: Daishowa Chemicals, Inc., Rothschild, Wis.

[21] Appl. No.: 529,220

[22] Filed: May 25, 1990

[51] Int. Cl.$^5$ .............................. C05C 9/00; C05G 3/00
[52] U.S. Cl. ........................................ 71/28; 71/64.05; 71/64.07; 71/64.12; 564/63
[58] Field of Search ............... 71/28, 61, 64.05, 64.07, 71/64.12; 564/63

[56] References Cited

U.S. PATENT DOCUMENTS

| | | | |
|---|---|---|---|
| 4,587,358 | 5/1986 | Blouin | 564/63 |
| 4,676,821 | 6/1987 | Gullett et al. | 71/28 |
| 4,743,289 | 5/1988 | Mickus et al. | 71/63 X |

*Primary Examiner*—Ferris H. Lander
*Attorney, Agent, or Firm*—Andrus, Sceales, Starke & Sawall

[57] ABSTRACT

Urea fertilizer is treated with a modified lignosulfonate to harden and provide anti-caking and anti-dusting properties to the fertilizer particles. The fertilizer/modified lignosulfonate mixture includes up to about 5.0% by weight modified lignosulfonate on fertilizer. An improved method of treating urea fertilizer with a modified lignosulfonate is also disclosed.

20 Claims, No Drawings

MODIFIED LIGNOSULFONATE CONDITIONING AGENT FOR UREA PARTICLES

BACKGROUND OF THE INVENTION

The present invention relates to fertilizers, and more particularly urea fertilizer treated with an improved lignosulfonate conditioning agent to harden and give anti-caking and anti-dusting properties to the fertilizer particles.

The use of solid urea fertilizer as a source of nitrogen is well known. Methods of manufacturing urea fertilizer as well as methods of processing fertilizer into particles via prill and/or granulation techniques are also well known. The resulting fertilizer particles, however, exhibit several undesirable characteristics. First, such particles tend to cake when stored and transported in bulk such that the initial free flowing particles change to a solid, substantially integral mass. Secondly, such particles easily break into smaller particles resulting in a substantial amount of dust being created when handled, transported and when eventually applied to the soil.

In order to overcome the above disadvantages, the prior art has taught a number of conditioning agents which may be added to the fertilizer during processing to harden and give anti-caking and anti-dusting properties to fertilizer particles. For example, anti-caking properties have been imparted to fertilizer particles by utilizing clay, talc, surfactants, or a combination of these three conditioners, to coat the particles. Additionally, various oils are sprayed on the particles for controlling dust. Also, a phosphoric acid-boric acid compound known under the trademark "Permalene" and available from Mississippi Chemical, has been utilized in phosphate production as a hardening agent.

It is also known to add 0.1% to 0.5% by weight of formaldehyde to urea during urea manufacturing to overcome the above noted disadvantages. The following patents discuss the reaction of formaldehyde with urea to form ureaformaldehyde products: U.S. Pat. Nos. 3,112,343; 4,160,782; and 4,204,053. Health and safety considerations, however, have severely limited the use of formaldehyde in fertilizer products, and in fact formaldehyde is not widely accepted for use as a conditioning agent in the preparation of urea or other fertilizers. Urea has also been treated with 0.1% to 5% by weight of lignosulfonates as shown in U.S. Pat. No. 4,587,358.

SUMMARY OF THE INVENTION

A urea fertilizer is treated with a modified lignosulfonate conditioning agent to harden the fertilizer particles and give anti-caking and anti-dusting properties to the fertilizer. The modified lignosulfonate conditioning agent may be incorporated into various fertilizer manufacturing processes such as granulation and crystallization, i.e. prill, systems to impart the above advantageous properties to urea fertilizer produced in solid particulate forms for direct application to soil. The addition of a modified lignosulfonate conditioning agent to urea fertilizer results in harder particles less susceptible to breakage and formation of fines, and gives anti-caking and anti-dusting properties in one step without the need for any secondary or additional conditioners. The substitution of modified lignosulfonates for materials such as formaldehyde not only reduces the cost of the fertilizer product, but also eliminates any health and safety considerations in that lignosulfonates are approved for use as additives in animal feed products.

The fertilizer manufacturing process may incorporate up to about 5.0% by weight of the modified lignosulfonate conditioning agent with about 0.1% to about 2.0% preferred. Hardness is lowered presumably through a diluent effect if more than about 2% by weight of the agent is used.

DESCRIPTION OF THE PREFERRED EMBODIMENT

In preparing the modified lignosulfonate treated urea fertilizer of the present invention, a desired lignosulfonate is first modified to convert a substantial portion of its sugar content to sugar acids or metal salts of sugar acids and then homogeneously mix the modified lignosulfonate with urea fertilizer during fertilizer production. Up to about 5.0% by weight modified lignosulfonate may be added to the fertilizer with about 0.1% to about 2.0% preferred. 0.1% percent is the preferred practical lower limit since below this dosage, there is inadequate hardness increase due to insufficient modified lignosulfonate for binding, and 2.0% is believed to be the practical upper limit since about this dosage hardness once again decreases which is presumably due to a diluent effect.

The fertilizer utilized in the present invention with the modified lignosulfonate conditioning agent hereinafter to be described is urea. Methods of urea production as well as methods of processing urea into particles via prill and/or granulation techniques are commonly known and need not be described in detail herein.

In present urea prill production, a urea fertilizer generally at 70% solids concentration in water is heated in evaporators to about 285° F. to remove substantially all the water. The molten fertilizer is then injected as droplets to an air cooling tower where crystalline fertilizer is formed as a hard prill or bead used for shipment. With the present process, up to about 5.0% by weight modified lignosulfonate conditioning agent may be added to the 70% fertilizer solution prior to heating, with 0.1% to 2.0% preferred. The modified lignosulfonate conditioning agent is soluble in the molten fertilizer and solidifies with the fertilizer when cooled in the air cooling tower. Since the modified lignosulfonate conditioning agent is soluble in the urea melt at the necessary levels of addition, the modified lignosulfonate conditioning agent is homogeneously distributed within the urea granules or prills. The modified lignosulfonate conditioning agent is the ingredient that provides the desired advantages for the urea fertilizer and once the molten fertilizer and lignosulfonate conditioning agent are crystallized it is believed that the lignosulfonate conditioning agent serves to encase or entrap the fertilizer to harden and give anti-caking and anti-dusting properties to the fertilizer particles. Modified lignosulfonate in either powder or liquid form may be utilized.

Raw materials useful in the present invention are by-products of the sulfite pulping paper process, generically known as lignosulfonates. These are water soluble metal or ammonium salts of lignosulfonic acid, incorporating varying contents of hexose and pentose sugars, sugar acids, and carbohydrates. Any type of lignosulfonate i.e. hardwood, softwood, crude or purified may be employed. For example, calcium lignosulfonates, sodium lignosulfonates, ammonium lignosulfonates, modified lignosulfonates, and mixtures or blends thereof may all be utilized herein. Lignosulfonates are available from numerous sources, in either aqueous solution or dried powder forms. For example, Daishowa Chemicals, Inc. sells lignosulfonates under the trade designations "Lignosol" and "Norlig" which are appropriate for use in the present invention. In the present invention, these lignosulfonate by-products are reacted with alkali metal hydroxides or alkaline earth hydroxides, thereby converting a substantial portion of the sugar content to sugar acids or metal salts of sugar acids.

In the preferred embodiment of this invention lignosulfonates in water solution are reacted with 5% to 30% by weight of an alkali metal hydroxide or alkaline earth hydroxide. In the most preferred embodiment of this invention, lignosulfonates in water solution are reacted with 5% to 20% by weight of an alkaline earth hydroxide.

The alkali metal hydroxides useful in the practice of the present invention are any of the hydroxides of alkali metals, namely, lithium, sodium, potassium, rubidium, cesium and francium. Further, the alkaline earth hydroxides useful in the practice of the present invention include any of the hydroxides of alkaline earth metals, namely calcium, strontium, barium, magnesium, beryllium and radium. The preferred hydroxides are sodium, potassium, calcium and magnesium hydroxides with calcium hydroxide being most preferred.

In order that those skilled in the art may better understand how the present invention can be practiced, the following examples are given by way of illustration only and not by way of limitation, since various changes therein may be made by those skilled in the art without departing from the scope of the present invention.

Although the data disclosed in the following examples describes the use of a specific modified calcium lignosulfonate, the present invention is not limited thereto, in that a number of other reaction products of alkali metal hydroxide or alkaline earth hydroxides with various metal lignosulfonates or ammonium lignosulfonates are considered within the scope of the present invention.

EXAMPLE 1

A calcium lignosulfonate produced by Daishowa Chemicals Inc., containing about 16% sugars by weight of total solids, was reacted with 10% by weight of calcium hydroxide during three hours at a temperature of 85° C. The product, designated Modified Lignosulfonate Conditioning Agent (MLCA), contains only about 3% sugars, with a major proportion of the initial sugar content of the raw materials being converted to the calcium salt of sugar acids.

One-hundred gram batches of molten urea at 140° C. were treated by adding 0.4% of MLCA by weight of urea, with good mixing. The mixture was then poured into porcelain color plates where it solidified into hemispheric pieces about 8-millimeters thick and 20-millimeters wide. After cooling and aging 24-hours, the urea hemispheres were tested for hardness by compressing them in a compression tester to the breaking point. Urea hemispheres containing 0.4% of a conventional calcium lignosulfonate, as well as 0.4% of formaldehyde (CHOH) were similarly produced and tested as control samples. The treated urea hemispheres were tested for moisture absorption or hygroscopicity by storing them for 24-hours in a humidity chamber at 22° C. and 95% relative humidity. The percent moisture absorption was determined by weighing the granules before and after the storage test, and calculating the percent gain in weight. The crushing strength and hygroscopicity test results are shown in Table 1 below.

TABLE 1

| | Urea hemisphere tests. | | |
|---|---|---|---|
| Additive | CHOH | Calcium Lignosulfonate | MLCA |
| Weight % Additive in Urea | 0.4 | 0.4 | 0.4 |
| Crushing Strength, Kg | 25.8 | 26.0 | 28.9 |
| Increased Strength Over Formaldehyde-Treated Control, Kg | — | 0.2 | 3.1 |
| Moisture Absorption in 24-hours @ 95% R.H., 22° C. weight gain, % | 12.0 | 11.2 | 9.9 |

From the above data it is apparent that the modified lignosulfonate product, MLCA, imparted to the urea hemispheres much lower hygroscopicity and higher crushing strength than was obtained by the use of formaldehyde or of a conventional unmodified calcium lignosulfonate.

EXAMPLE 2

A modified lignosulfonate, MLCA, was prepared as in Example 1. Urea granules containing 0.4% MLCA by weight of urea product were prepared in the laboratory using a disk granulator. These granules were tested for hygroscopicity by storage for 24 hours in humidity chambers at 75% and 95% relative humidity, both at temperatures of 18° C. and 40° C. Commercially produced urea granules containing 0.4% and 0.6% of a conventional calcium lignosulfonate, or containing 0.4% of formaldehyde, were tested as control samples. The percent moisture absorption was determined by weighing the granules before and after the storage test, and calculating the percent gain in weight. The test results are shown in Table 2 below.

TABLE 2

| | | Hygroscopicity of urea granules. | | | |
|---|---|---|---|---|---|
| | | Additive | | | |
| Relative Humidity | Temperature, °C. | Calcium Lignosulfonate | | CHOCH | MLCA |
| | | 0.4% | 0.6% | 0.4 | 0.4% |
| 75% | 18 | 0.5 | 0.6 | 0.4 | 0.2 |
| 75% | 40 | 2.2 | 2.5 | 3.1 | 1.2 |
| 95% | 18 | 1.9 | 1.8 | 1.8 | 1.6 |
| 95% | 40 | 9.4 | 10.8 | 10.0 | 9.1 |

From the above data it is apparent that the modified lignosulfonate product, MLCA, imparted to the urea granules much lower hygroscopicity properties than were obtained by the use of formaldehyde or a conventional calcium lignosulfonate, under all conditions of relative humidity and temperature which were employed.

Visual observation is employed to determine whether a conditioner that increases granule or hemisphere hardness also imparts anti-dusting properties. Such visual observations were made during the handling of the various urea particles utilized to obtain the data of Table 1 and it was determined that the modified lignosulfonate product, MLCA, imparted better anti-dusting properties than were obtained by the use of formaldehyde or a conventional calcium lignosulfonate. Visual observation during the hygroscopicity tests which were used to obtain the data in Tables 1 and 2 also showed that MLCA imparted better anti-caking properties than were obtained by the use of formaldehyde or a conventional calcium lignosulfonate.

It is clear from the above Examples that the hardness as well as the anti-caking and anti-dusting properties of urea fertilizer has increased dramatically when a modified lignosulfonate conditioning agent as disclosed herein is employed therewith.

In any of the fertilizer granulation processes, up to about 5.0% modified lignosulfonate conditioning agent by weight may be added to the fertilizer, and it is preferred to add 0.1% to 2.0% by weight modified lignosulfonate conditioning agent in the granulation process. The modified lignosulfonate conditioning agent in either liquid or solid form may be incorporated in the granulation process in the reaction tanks, in the recycled fines, or directly in the granulators. Preferably, the modified lignosulfonate conditioning agent is incorporated in the urea melt (either anhydrous or containing varying amounts of water). The hardness of the resultant urea fertilizer granules is increased to thus provide stronger fertilizer granules having improved anti-caking and anti-dusting properties.

Various modes of carrying out the invention are contemplated as being within the scope of the following claims particularly pointing out and distinctly claiming the subject matter which is regarded as the invention.

We claim:

1. A composition of matter consisting essentially of a homogeneous admixture of a urea fertilizer, and up to about 5.0% by weight of a modified lignosulfonate conditioning agent such that hardness, anti-caking and anti-dusting properties of the fertilizer are increased, said modified lignosulfonate conditioning agent is a reaction product of a metal lignosulfonate salt or ammonium lignosulfonate salt with an alkali metal hydroxide or alkaline earth hydroxide in an amount ranging from about 5% to about 30% of the weight of said salt.

2. The composition of claim 1, wherein said modified lignosulfonate conditioning agent comprises about 0.1% to about 2.0% by weight of said admixture.

3. The composition of claim 1, wherein said modified lignosulfonate conditioning agent is selected from the group consisting of sulfite lignin and a sulfonated lignin.

4. The composition of claim 1, wherein said modified lignosulfonate conditioning agent is obtained from the pulping of hardwoods.

5. The composition of claim 1, wherein said modified lignosulfonate conditioning agent is obtained from the pulping of softwoods.

6. The composition of claim 1, wherein said alkali metal hydroxide is a hydroxide of an alkali metal selected from the group consisting of sodium and potassium.

7. The composition of claim 1, wherein said alkaline earth hydroxide is a hydroxide of an alkaline earth metal selected from the group consisting of calcium and magnesium.

8. The composition of claim 1, wherein said agent ranges from about 0.1% to about 1.0% by weight of said composition.

9. The composition of claim 1, wherein said agent is prepared by reacting a metal lignosulfonate salt or ammonium lignosulfonate salt with calcium hydroxide.

10. The composition of claim 1, wherein said agent is prepared by reacting a metal lignosulfonate salt or ammonium lignosulfonate salt with a quantity of calcium hydroxide ranging from about 5% to about 20% of the weight of said lignosulfonate salt.

11. A method of treating urea fertilizer to improve the fertilizer's hardness, anti-caking and anti-dusting properties, comprising the steps of:
preparing a homogeneous admixture consisting essentially of up to about 5.0% by weight of a modified lignosulfonate conditioning agent and urea fertilizer,
wherein said agent is prepared by reacting a metal lignosulfonate salt or ammonium lignosulfonate salt with an alkali metal hydroxide or alkaline earth hydroxide, in an amount ranging from about 5% to about 30% of the weight of said salt; and
processing said admixture into a particulate form.

12. The method of claim 11, wherein said step of processing involves producing granules and said lignosulfonate is sprayed onto the fertilizer.

13. The method of claim 12, wherein said step of processing involves producing prill and said lignosulfonate agent is mixed with molten fertilizer prior to cooling.

14. The method of claim 12, wherein said lignosulfonate agent comprises from about 0.1% to about 2.0% by weight of the admixture.

15. The method of claim 11, wherein said lignosulfonate is obtained from the pulping cf hardwoods.

16. The method of claim 11, wherein said lignosulfonate is obtained from the pulping of softwoods.

17. The method of claim 11, wherein said agent ranges from about 0.1% to about 1.0% by weight of said admixture.

18. The method of claim 11, wherein said agent is prepared by reacting a metal lignosulfonate salt or ammonium lignosulfonate salt with an alkaline earth hydroxide.

19. The method of claim 11, wherein said agent is prepared by reacting a metal lignosulfonate salt or ammonium lignosulfonate salt with calcium hydroxide.

20. The method of claim 11, wherein said agent is prepared by reacting a metal lignosulfonate salt or ammonium lignosulfonate salt with a quantity of calcium hydroxide ranging from about 5% to about 20% of the weight of said lignosulfonate salt.

* * * * *